(12) United States Patent (10) Patent No.: US 11,942,752 B2
Brons et al. (45) Date of Patent: Mar. 26, 2024

(54) METHOD AND LASER SYSTEM FOR GENERATING OUTPUT LASER PULSES WITH AN OPTICAL COMPONENT WITH TEMPERATURE-DEPENDENT POWER EFFICIENCY AND ASSOCIATED COMPUTER PROGRAM PRODUCT

(71) Applicant: TRUMPF Laser GmbH, Schramberg (DE)

(72) Inventors: Jonathan Brons, Oberndorf (DE); Rainer Flaig, Eschbronn (DE); Dirk Sutter, Rottweil (DE); Ivo Zawischa, Gundelfingen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 18/448,217

(22) Filed: Aug. 11, 2023

(65) Prior Publication Data
US 2023/0387640 A1 Nov. 30, 2023

Related U.S. Application Data

(63) Continuation of application No. PCT/EP2021/087158, filed on Dec. 21, 2021.

(30) Foreign Application Priority Data

Feb. 17, 2021 (DE) ..................... 10 2021 201 493.3

(51) Int. Cl.
*H01S 3/00* (2006.01)
*H01S 3/10* (2006.01)
*H01S 3/13* (2006.01)

(52) U.S. Cl.
CPC .......... *H01S 3/0092* (2013.01); *H01S 3/0085* (2013.01); *H01S 3/10015* (2013.01); *H01S 3/1302* (2013.01)

(58) Field of Classification Search
CPC .. H01S 3/0092; H01S 3/0085; H01S 3/10015; H01S 3/1302
See application file for complete search history.

(56) References Cited

U.S. PATENT DOCUMENTS

| 6,697,390 B2 | 2/2004 | Kafka et al. |
| 7,242,700 B2 | 7/2007 | Wang |

(Continued)

FOREIGN PATENT DOCUMENTS

| DE | 102014017568 A1 | 6/2016 |
| DE | 102017210272 B3 | 11/2018 |

(Continued)

*Primary Examiner* — Xinning(Tom) Niu
(74) *Attorney, Agent, or Firm* — LEYDIG, VOIT & MAYER, LTD.

(57) ABSTRACT

A method for generating output laser pulses from input laser pulses includes causing the input laser pulses to temporally successively pass through an optical component with temperature-dependent power efficiency. The optical component is heated by the passing of the input laser pulses. The input laser pulses emerge from the optical component as output laser pulses. The method further includes calculating a current temperature or a current temperature difference of the optical component, or a temperature-dependent current parameter based on all preceding input laser pulses or output laser pulses that have contributed to the heating of the optical component, and setting a power of a current input laser pulse based on the calculated current temperature, or the calculated current temperature difference, or the calculated current parameter, so that an associated output laser pulse has a pulse energy that deviates from a predefined pulse energy by less than 5%.

18 Claims, 5 Drawing Sheets

(56) References Cited

U.S. PATENT DOCUMENTS

| | | | |
|---|---|---|---|
| 7,826,502 B2 | 11/2010 | Lu et al. | |
| 7,916,764 B2 | 3/2011 | Wang | |
| 8,160,113 B2 | 4/2012 | Adams et al. | |
| 8,717,670 B2 | 5/2014 | Starodoumov et al. | |
| 8,879,589 B2 | 11/2014 | Muendel et al. | |
| 11,735,884 B2 * | 8/2023 | Flaig | H01S 3/2308 |
| | | | 359/333 |
| 2020/0127434 A1 * | 4/2020 | Flaig | H01S 3/1302 |

FOREIGN PATENT DOCUMENTS

| | | | | |
|---|---|---|---|---|
| DE | 102018200811 A1 | 7/2019 | | |
| DE | 102020206636 B3 | 7/2021 | | |
| JP | 2016181184 A * | 10/2016 | | |
| WO | WO-2018108900 A1 * | 6/2018 | ........... | H01S 3/0057 |
| WO | WO 2018108900 A1 | 6/2018 | | |

* cited by examiner

METHOD AND LASER SYSTEM FOR GENERATING OUTPUT LASER PULSES WITH AN OPTICAL COMPONENT WITH TEMPERATURE-DEPENDENT POWER EFFICIENCY AND ASSOCIATED COMPUTER PROGRAM PRODUCT

CROSS REFERENCE TO RELATED APPLICATIONS

This application is a continuation of International Application No. PCT/EP2021/087158 (WO 2022/174961 A1), filed on Dec. 21, 2021, and claims benefit to German Patent Application No. DE 10 2021 201 493.3, filed on Feb. 17, 2021. The aforementioned applications are hereby incorporated by reference herein.

FIELD

Embodiments of the present invention relate to a method for generating output laser pulses from input laser pulses, and also relate to a laser system suitable for carrying out this method and to an associated control program product.

BACKGROUND

In laser systems with temperature-dependent power efficiency, e.g. laser systems with frequency conversion, thermal lenses, etc., the laser pulse power may be temperature-dependent, and fluctuations in the peak pulse power, pulse energy, pulse duration or pulse quality may occur at very high powers owing to temperature-dictated properties.

In order to obtain a constant efficiency during the frequency conversion, in U.S. Pat. No. 6,697,390 B2 the temperature is measured at the nonlinear conversion crystal and the constant efficiency is achieved by way of heating/cooling that keeps the conversion crystal at a constant temperature level. In addition, the pump power is adapted in order to compensate for degradation in a nonlinear crystal.

Frequency-converted, in particular pulsed, laser radiation with arbitrary, external individual pulse triggering (so-called POD (Pulse on Demand) laser pulses) generates a non-constant, unforeseeable thermal load in the laser system and the fluctuations of the individual pulse energy (e.g. as a result of phase mismatch or a change in beam sizes). On the time scales relevant to typical processing processes, these fluctuations cannot be sufficiently rectified by closed-loop control in order to attain a pulse-to-pulse stability of typically less than 1-2% r.m.s.

In respect of the output parameters of conversion efficiency and laser pulse energy of the optical frequencies to be generated (phase matching), laser systems with nonlinear frequency conversion react sensitively in particular to beam size and beam quality and also to phase matching of the fundamental laser radiation on the input side. A non-instantaneous change in these parameters arises if the laser system is brought out of its thermal equilibrium (load change), as is the case with arbitrary, external individual pulse triggering. POD laser pulses inherently require very fast, dynamic load changes that generally cannot be foreseen by the laser manufacturer. With a narrow specification of the pulse-to-pulse stability (e.g. 1-2% r.m.s.), that may pose a problem, especially since a closed-loop control is then too slow for the general case. In the case of laser systems having pulse spacings of the requested pulses in the microseconds range, these fluctuations can no longer be compensated for by way of a temperature closed-loop control, since thermal compensation can typically be ensured only in the milliseconds/seconds range.

Known short pulse laser systems having pulse durations in the femtoseconds or picoseconds range have a clock rate-dependent laser pulse energy at constant pump power and are generally operated with constant frequency. In POD operation, the user would like to operate the laser pulses with freely selectable triggering and constant settable pulse energy. Previous POD schemes concentrate on constant pulse energy. In the case of a nonlinear system, identical nonlinearities additionally have to be ensured in order to obtain the same temporal pulse properties, such as e.g. pulse duration and pulse width. This is important for subsequent frequency conversion or other nonlinear processes (e.g. glass cutting).

With knowledge of a processing program that always remains constant (with a mean average power that does not vary too much), the POD parameters can be set to a specific operating point and a minimum energy deviation can be set. Automatic parameterization routines for optimizing the POD parameters that have been used hitherto are slow since the parameters are determined with settled thermal equilibrium at a fixed repetition rate (plus sacrificial laser pulses).

SUMMARY

Embodiments of the present invention provide a method for generating output laser pulses from input laser pulses having previously known pulse energies and pulse spacings. The method includes causing the input laser pulses to temporally successively pass through an optical component with temperature-dependent power efficiency. The optical component is heated by the passing of the input laser pulses. The input laser pulses emerge from the optical component as output laser pulses for setting a respective pulse power component of the output laser pulses. The method further includes calculating a current temperature or a current temperature difference of the optical component, or a temperature-dependent current parameter based on all preceding input laser pulses or output laser pulses that have contributed to the heating of the optical component, and setting a power of a current input laser pulse based on the calculated current temperature, or the calculated current temperature difference, or the calculated current parameter, so that an associated output laser pulse has a pulse energy that deviates from a predefined pulse energy by less than 5%.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention can produce, despite the temperature-dependent power efficiency of an optical component, output laser pulses having low jitter, namely having pulse energy deviations of less than 5%, preferably less than 2%, in particular having in each case the same pulse energy, and also of specifying an associated laser system.

According to embodiments of the invention, a current temperature or a current temperature difference of the optical component, or a temperature-dependent current parameter is calculated on the basis of all preceding input or output laser pulses which have contributed to the current heating of the optical component, and the power of a current input laser pulse is set on the basis of the calculated current temperature, the calculated current temperature difference or the calculated current parameter in such a way that the associated output laser pulse has a pulse energy which deviates from a predefined pulse energy by less than 5%, preferably by less than 2%, and in particular is equal to the predefined pulse energy. Preferably, the selected input laser pulses are amplified or frequency-converted by the optical component.

The temperature difference may relate to the "cold" equilibrium state (thermal equilibrium) of the optical component. The temperature-dependent parameter can be a temperature-dependent control parameter, for example.

According to embodiments of the invention, by means of a computational model, a temperature or temperature difference of the optical component or a temperature-dependent parameter is calculated or simulated almost in real time and from it a correction of the laser pulse energy can be derived and modulated on the current input laser pulse. The calculated temperature, temperature difference and parameter is not a real temperature, temperature difference or measurement variable of the optical component, but rather an abstract variable. In this case, the computational model incorporates every preceding laser pulse which has passed through the optical component and has contributed to the current heating of the optical component. The power of the current input laser pulse is then adapted in order to attain the desired pulse energy after passing through the optical component. By way of example, the power of the current input laser pulse can be set on the basis of the deviation of the calculated current temperature from a predefined (full-load) operating temperature of the optical component.

The method according to embodiments of the invention affords the following advantages, in particular:
- arbitrary dynamic trigger programs can be instigated despite different operating points with differently manifested thermal load.
- a dead time (typically several seconds) for the settling of the laser before the beginning of the process can be dispensed with.

more complex thermal behavior, e.g. with a plurality of optical components each with temperature-dependent power efficiency, can be simulated for example by way of a model with a plurality of separate temperatures.

Preferably, the power of the current input laser pulse is set or modified before passing through the optical component by way of the trimming of its pulse shape, in particular by way of the trimming of its amplitude and/or at least one of its two pulse edges. Alternatively or additionally, as early as when the current input laser pulse is generated, the power thereof can be correspondingly set on the basis of the calculated current temperature, the calculated current temperature difference or the calculated current parameter.

For the case where the input laser pulses are amplified upstream of the optical component and in the process at least one input laser pulse is used as additional pulse (so-called sacrificial laser pulse), this sacrificial laser pulse is preferably coupled out of the path of the amplified input laser pulses again upstream of the optical component.

Instead of a single input laser pulse, a plurality of adjacent input laser pulses can also pass through the optical component as a laser burst and emerge from the optical component as an output laser burst.

In one method variant, the input laser pulses are provided at times such that the output laser pulses arrive at an output as POD laser pulses at individually requested times. If necessary, at least one input laser pulse is used as additional pulse (so-called sacrificial laser pulse), which is then coupled out of the path of the amplified input laser pulses again.

Preferably, individual laser pulses are selected from a pulse sequence of (seed) laser pulses having known pulse energies, in particular in each case the same pulse energies, said laser pulses preferably being repeated at a fixed frequency, and are provided as input laser pulses having in each case known pulse energies and pulse spacings. Alternatively, laser pulses can already be generated with in each case known pulse energies and pulse spacings and be provided as input laser pulses.

In a further aspect, embodiments of the invention also relate to a laser system for generating output laser pulses from input laser pulses having in each case previously known pulse energies and pulse spacings, comprising:
- a pulse source for providing input laser pulses having in each case previously known pulse energies and pulse spacings,
- an optical component with temperature-dependent power efficiency, through which the input laser pulses pass and which is heated in the process, the input laser pulses emerging from the optical component as output laser pulses,
- a power setting device for setting the respective pulse power of the input laser pulses, and
- a control unit (e.g. FPGA (Field Programmable Gate Array) or microcontroller) programmed to calculate a current temperature or a current temperature difference of the optical component or a temperature-dependent current parameter on the basis of all preceding input laser pulses which have contributed to the current heating of the optical component, and to control the power setting device for a current input laser pulse on the basis of the calculated current temperature, the calculated current temperature difference or the calculated current parameter in such a way that the associated output laser pulse has a pulse energy which deviates from a predefined pulse energy by less than 5%, preferably by less than 2%, and in particular is equal to the predefined pulse energy.

The optical component can be for example an optical amplifier for amplifying the input laser pulses or a (nonlinear) conversion crystal for converting the frequency of the input laser pulses.

The power setting device is preferably configured as an acousto-optic modulator (AOM) or electro-optic modulator (EOM) for trimming the pulse shape of the current input laser pulse. The modulator can be controlled by the control unit with regard to opening time and opening duration such that the power of the current input laser pulse can be set as desired by way of the trimming of its pulse shape, in particular by way of the trimming of its amplitude and/or at least one of its two pulse edges. Alternatively, the power setting device can also be formed by a power closed-loop control facility for the laser pulses generated as input laser pulses by the pulse source in order to set the power of the current input laser pulse as desired.

An optical amplifier for amplifying the input laser pulses can be arranged upstream of the optical component. For the case where sacrificial laser pulses are also amplified in the amplifier, advantageously a coupling-out unit (e.g. AOM or EOM) controlled by the control unit for coupling the amplified sacrificial laser pulses out of the path of the amplified input laser pulses is disposed downstream of the amplifier and in particular upstream of the optical component.

In one preferred embodiment, the pulse source comprises a laser pulse generator for generating (seed) laser pulses having known pulse energies, in particular in each case the same pulse energies, said laser pulses preferably being repeated at a fixed frequency, and a selection unit for selecting some of the laser pulses as input laser pulses at in each case previously known pulse times, said selection unit being controlled by the control unit In another preferred embodiment, the pulse source comprises a laser pulse generator controlled by the control unit in order to generate input laser pulses whose pulse energies and pulse times are predefined by the control unit. In this case, the seed laser pulse generator can be embodied as:
a fiber oscillator and amplifier (fiber or other medium) with pulse durations in the fs-ns range;
laser diode and amplifier (fiber or other medium) with pulse durations in the ns range.

Embodiments of the invention also relate to a control program product comprising code means adapted for carrying out all the steps of the method described above when the program runs on a control unit of the laser system described above.

Figure 1:
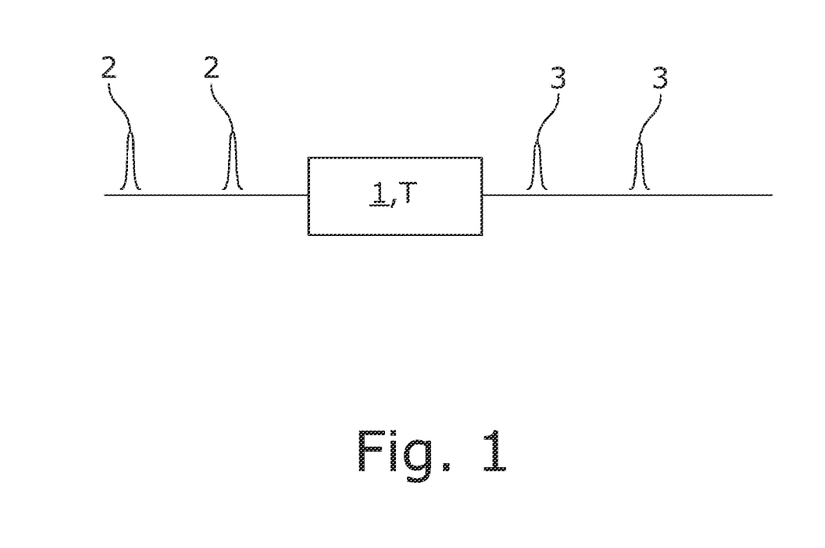
FIG. 1 schematically shows an optical component with temperature-dependent power efficiency through which input laser pulses pass according to some embodiments.

The optical component 1 shown in FIG. 1 serves for optically influencing a plurality of (here merely by way of example two) input laser pulses 2 which temporally successively pass through the optical component 2 and emerge from the optical component 2 as output laser pulses 3.

The optical component 1 has a temperature-dependent power efficiency and is heated by the input laser pulses 2 passing through, such that the power efficiency of the optical component 1 changes over time depending on the input laser pulses 2 that have passed through. The optical component 1 can be for example a nonlinear conversion crystal for converting the frequency of the input laser pulses 2 or an optical amplifier for amplifying the input laser pulses 2. An (abstract) current temperature T of the optical component 1 can be calculated on the basis of all preceding input laser pulses 2 which have passed through the optical component 1 and have thus contributed to the current heating of the optical component 1.

Figure 2A:
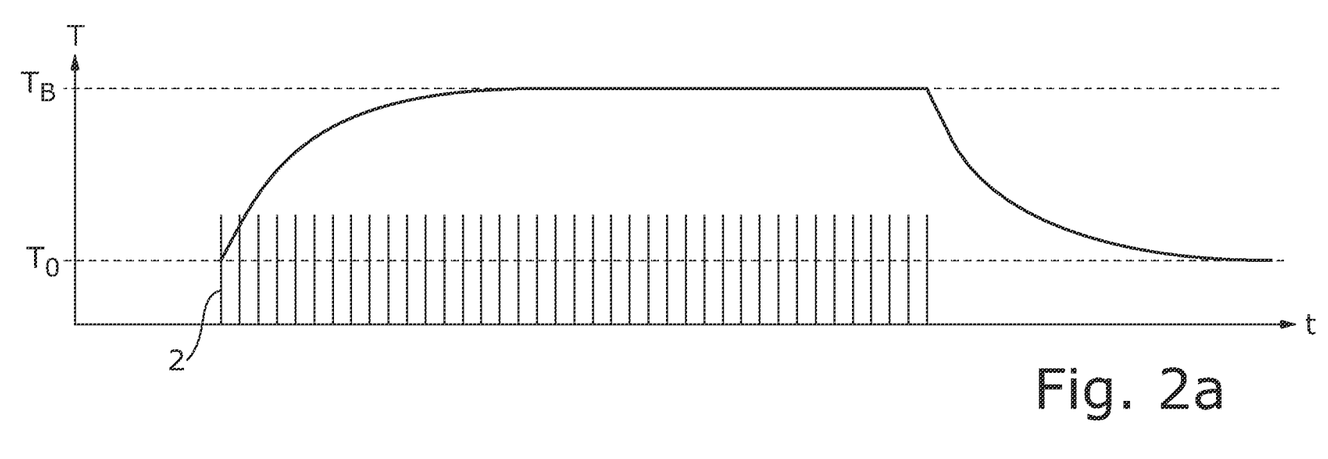
FIGS. 2a and 2b schematically show the temporal profile of a temperature—calculated according to embodiments of the invention—of the optical component with temperature-dependent power efficiency through which input laser pulses pass in the case of periodically repeated input laser pulses (FIG. 2a) having identical pulse energies and in the case of non-periodic input laser pulses having different pulse energies (FIG. 2b)
Figure 2B:
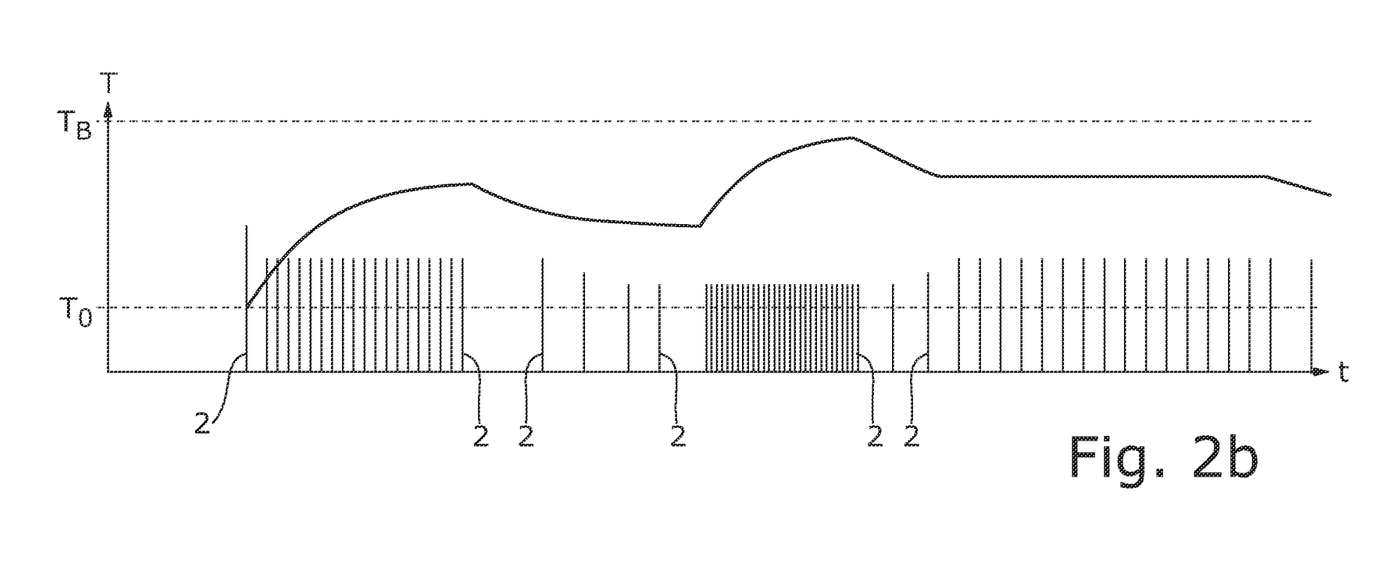

FIGS. 2a, 2b schematically show the temporal profile of the calculated current temperature T of the optical component 1 with temperature-dependent power efficiency through which input laser pulses 2 pass in the case of periodically repeated input laser pulses 2 having in each case identical pulse energies (FIG. 2a) and in the case of non-periodically repeated or only partly periodically repeated input laser pulses 2 having different pulse energies (FIG. 2b). The periodically repeated input laser pulses 2 have the effect that the optical component 1, proceeding from an initial temperature $T_0$ in the cold (switched-off) state, heats up to a substantially constant operating temperature T B. By contrast, non-periodically repeated input laser pulses 2 having different temporal spacings and/or different pulse energies lead to large temperature fluctuations between initial temperature $T_0$ and operating temperature T B and thus to considerable fluctuations of the power efficiency of the optical component 1.

Figure 3:
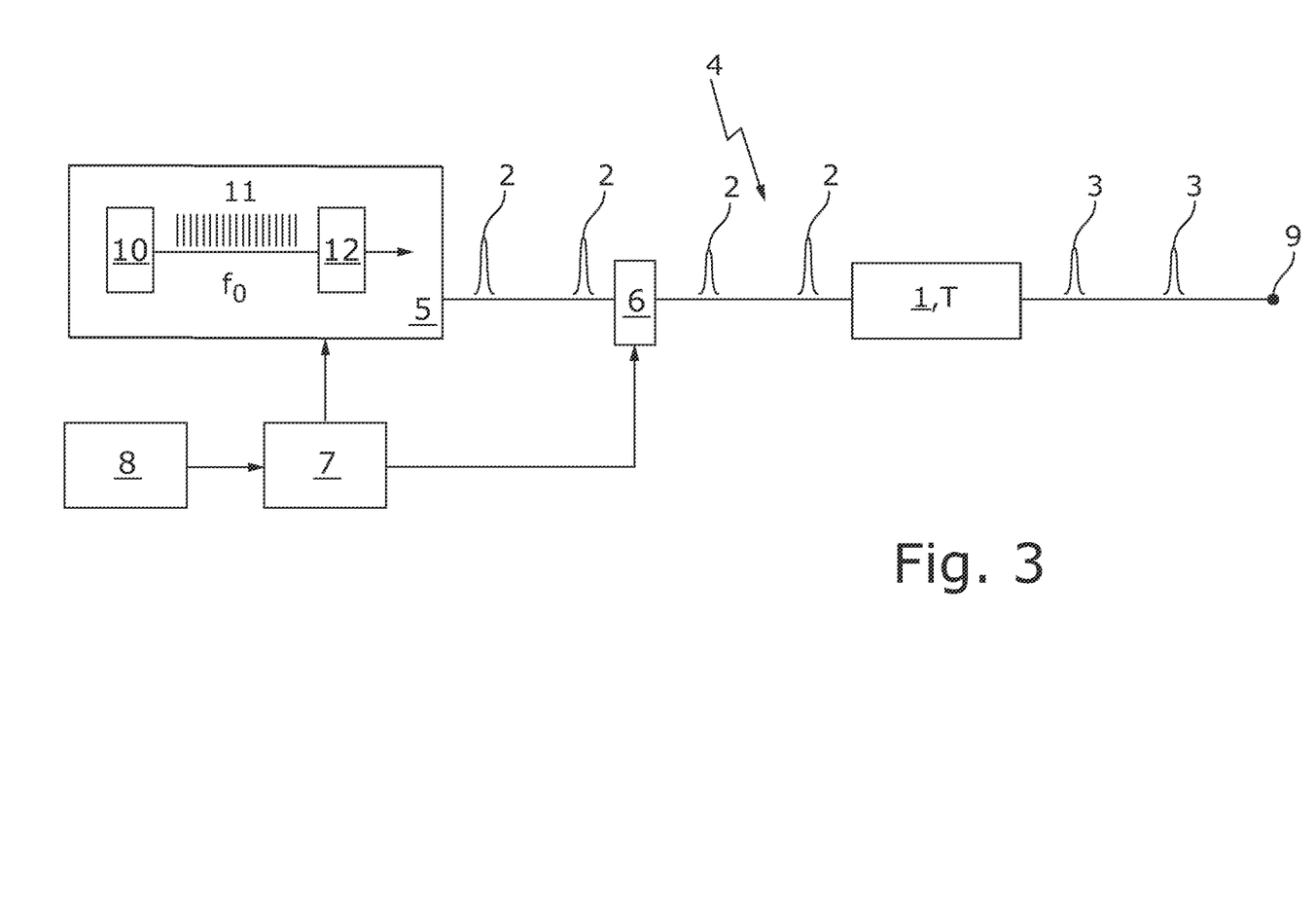
FIG. 3 schematically shows a first laser system according to embodiments of the invention comprising the optical components shown in FIG. 1.

The laser system 4 shown in FIG. 3 comprises the following components:
a pulse source 5 for providing input laser pulses 2 having in each case previously known pulse energies,
an optical component 1 with temperature-dependent power efficiency, through which the input laser pulses 2 pass and which is heated in the process, the input laser pulses 2 emerging from the optical component 1 as output laser pulses 3,
a power setting device 6 arranged between the pulse source 5 and the optical component 1, e.g. in the form of an AOM (acousto-optic modulator) or EOM (electro-optic modulator), for setting or reducing the respective pulse power of the input laser pulses 2, and
a control unit 7, which controls the pulse source 5 for providing an input laser pulse 2 and the power setting device 6 for setting the respective pulse power.

The optical component 1 can be for example a nonlinear conversion crystal for converting the frequency of the input laser pulses 2 or an optical amplifier for amplifying the input laser pulses 2. The pulse power of the input laser pulses 2 is reduced by the power setting device 6 by way of the amplitude and/or one or both pulse edges of the input laser pulses 2 being trimmed. The pulse portions removed by trimming are directed to an absorber (not shown).

The input laser pulses 2 having known pulse energies are temporally initiated by the control unit 7, that is to say that the control unit 7 knows both the pulse energies and the times of all initiated input laser pulses 2. The (abstract) current temperature T or, as described below, a (abstract) current temperature difference ΔT of the optical component 1 is calculated by the control unit 7 on the basis of all preceding input laser pulses 2 which have passed through the optical component 1 and have thus contributed to the current heating of the optical component 1. On the basis of the calculated current temperature T of the optical component 1, the control unit 7 temporally controls the power setting device 6 for a current input laser pulse 2, initiated by the control unit 7, in such a way that after passing through the optical component 1, the associated output laser pulse 3 has a pulse energy which deviates from a predefined pulse energy by less than 5%, preferably by less than 2%, and in particular is equal to the predefined pulse energy. The input laser pulses 2 are initiated or provided by the control unit 7—according to a user request 8—in such a way that the associated output laser pulses 3 arrive at an output 9 at individually requested POD (Pulse on Demand) times.

The method described functions solely by way of the temporal control of the laser source 5 and of the power setting device 6 by the control unit 7, that is to say that closed-loop control is not effected.

As shown in FIG. 3, the pulse source 5 can comprise a laser pulse generator 10 for generating (seed) laser pulses 11 and a selection unit (pulse picker) 12 controlled by the control unit 7, e.g. in the form of an AOM or EOM, for selecting some of the seed laser pulses 11 as input laser pulses 2. The laser pulse generator 10 repeats the seed laser pulses 11 with an input frequency $f_0$ which is fixedly set and lies in particular in the MHz range, e.g. in the range between 10 MHz and 200 MHz. The selected seed laser pulses 11 are allowed to pass as input laser pulses 2 without being deflected by the pulse picker 12, while the seed laser pulses 11 that are not selected are coupled out by the pulse picker 12 and directed to an absorber (not shown).

Instead of the illustration shown, the selection unit 12 and the power setting device 6 can be configured as one element.

Instead of a single seed laser pulse 11, two or more adjacent seed laser pulses 11 can in each case be selected as an "input laser burst" (pulse packet) which passes through the optical component 1 and emerges from the optical component 1 as an output laser burst.

Figure 4:
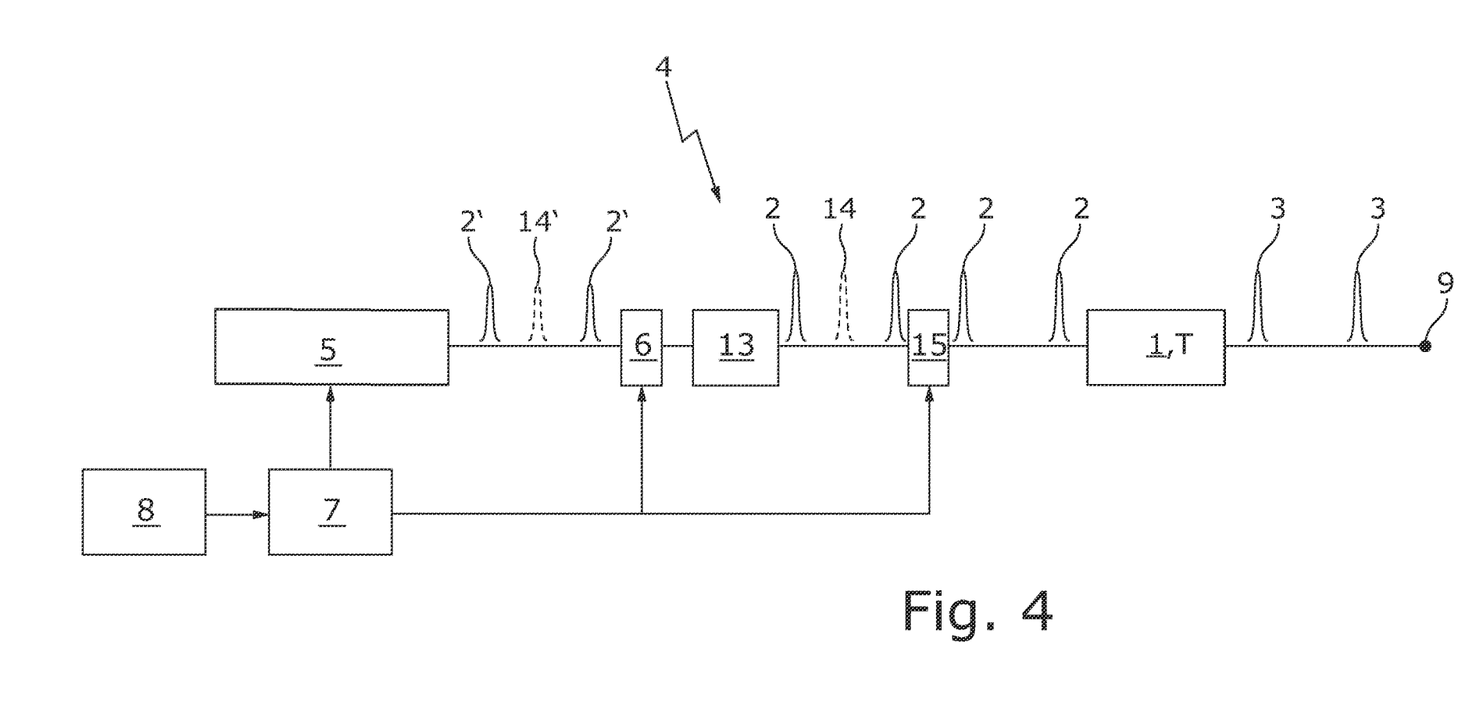
FIG. 4 shows the laser system shown in FIG. 3 comprising an additional optical amplifier according to some embodiments.

In the laser system 4' in FIG. 4, an optical amplifier 13 for amplifying the input laser pulses 2' is additionally arranged between the power setting device 6 and the optical component 1. In this case, the optical amplifier 13 has an amplification-free minimum time period which is predefined by the inversion establishment required for a minimum gain in the optical amplifier 13, and a maximum time period which is predefined by the inversion establishment required for a maximum gain in the optical amplifier 13. The minimum time period is based on the fact that after a pulse amplification, it is necessary first to re-establish the inversion in the gain medium of the optical amplifier 13 in order to ensure a pulse-to-pulse stability. The maximum time period prevents excessively long pulse pauses and thus excessively high gains which lead to undesirable pulse boosting.

For the case where the temporal pulse spacing between two output laser pulses 3 is greater than the maximum time period, the control unit 7 inserts a further input laser pulse as sacrificial laser pulse 14' between the two input laser pulses 2', which is separated from the second input pulse 2 to be amplified by at least the minimum time period and by at most the maximum time period. For this purpose, the pulse source 5 is temporally controlled accordingly by the control unit 7 in order to provide a further laser pulse as sacrificial laser pulse 14'. The two input laser pulses 2' and the sacrificial laser pulse 14' are amplified to form the laser pulses 2, 14 by means of the optical amplifier 13. A further coupling-out unit 15 arranged between the optical amplifier 13 and the optical component 1, e.g. in the form of an AOM or EOM, is temporally controlled by the control unit 7 in such a way that the amplified sacrificial laser pulse 14 is coupled out and directed to an absorber (not shown). The two amplified input laser pulses 2 pass through the optical component 1, e.g. a conversion crystal, and arrive at the output 9 as output pulses 3 at the requested times.

Instead of being provided externally, as shown, the power setting device 6 can alternatively also be integrated in the pulse source 5. Instead of being arranged upstream of the optical component 1, as shown, the further coupling-out unit 15 can alternatively also be arranged downstream of the optical component 1 in order to couple out the amplified sacrificial pulse 14'.

Figure 5:
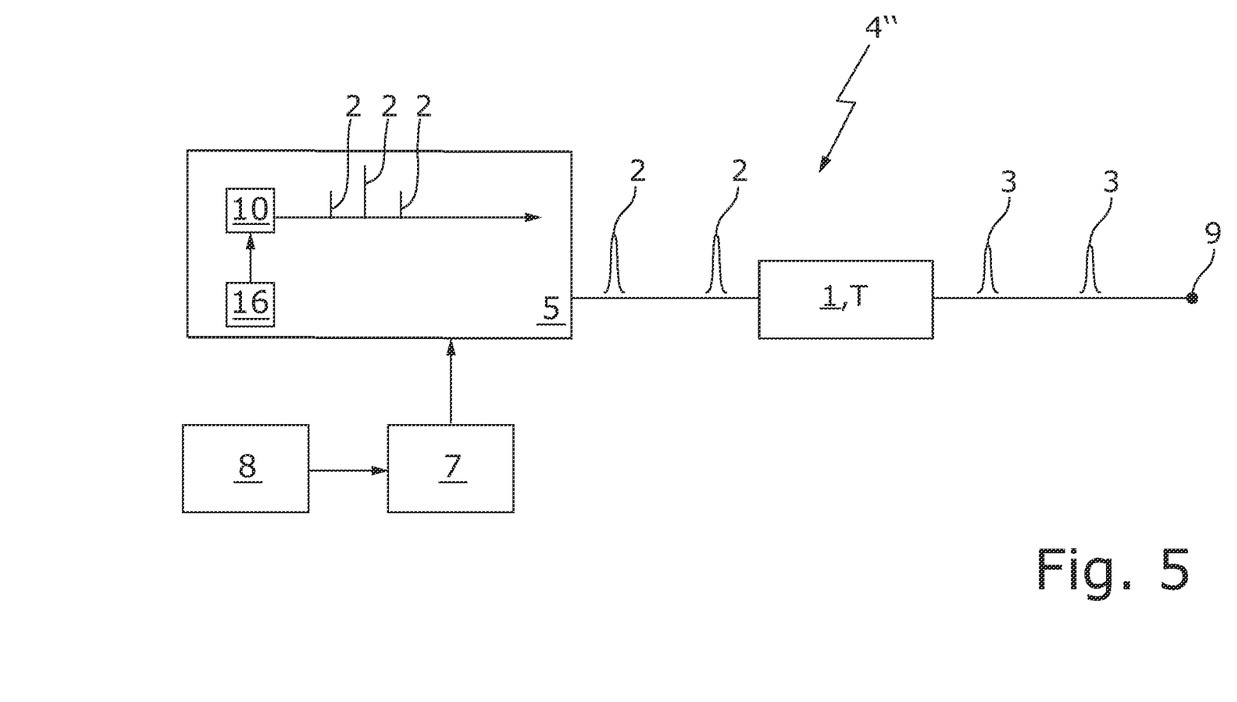
FIG. 5 schematically shows a second laser system according to embodiments of the invention comprising the optical component shown in FIG. 1.

The second laser system 4" shown in FIG. 5 differs from the laser system 4, 4' in FIGS. 3 and 4 merely in that here the pulse source 5 comprises a power closed-loop control facility 16 controlled by the control unit 7 for the laser pulse generator 10 in order thus to generate input laser pulses 2 having predefined, optionally different, pulse energies and pulse times. Alternatively, the pulse energy can also be set by a power setting device 6 arranged in the pulse generator 5.

A computational model for calculating the abstract temperature T of the optical component 1 is described below.

The transient response of the laser efficiency of the optical component 1 follows a cooling or heating process. Given knowledge of an effective temperature or temperature difference with respect to the "cold" equilibrium state of the optical component 1, the power setting device 6 can effect precompensation of the output power. In this case, the temperature difference can be understood as a correction variable and generally does not correspond to the actual temperature of the laser system 4, 4', 4".

The transfer function h of the optical component 1 will be described below by means of the input pulse energy $E_{in}$ of the pulses 2 and the output pulse energy $E_{out}$ of the pulses 3 upstream and respectively downstream of the optical component 1, which also experiences a contribution by $\Delta T$.

$$E_{in} \xrightarrow{h(\Delta T)} E_{out}$$

A model for h could be manifested as follows, for example:

$$E_{out} = h(E_{in}, \Delta T) = \hat{h}(E_{in})(1 + \Delta T)$$

In this case, let h be the characteristic curve of the optical component 1 in the cold state ($\Delta T = 0$). This characteristic curve can be measured experimentally with low heating power (large pulse spacing) and be stored as a table. It is assumed that for h and $\hat{h}$, in the relevant value and definition range, their inversions h and $\hat{h}^{-1}$ respectively exist.

The development of the temperature difference/correction variable $\Delta T$ can be described over time t e.g. as a differential equation and constitutes an initial value problem.

$$\frac{d\Delta T}{dt} = -\frac{\Delta T}{\tau} + \dot{q}(t)$$

For such a cooling or heating process, r and $\dot{q}(t)$ respectively denote an intrinsic time constant and a variable heating term and need to be known for the solution of $\Delta T(t)$. In this case, the heating term $\dot{q}(t)$ can make either a negative or a positive contribution to $\Delta T$.

The pulsed operation of the laser results in a natural, temporal discretization of the differential equation at the times $$t_i = \sum_{j=0}^{i} \Delta t_j,$$

which always relate to an associated time interval $\Delta t_i$ regarding the respectively preceding laser pulse. Hereinafter, $\Delta T_i$ is synonymous with $\Delta T(t_i)$. The time intervals $\Delta t_i$ need not be equidistant here. Such a temporal discretization makes possible numerical solution schemes, such as e.g. a description by means of finite differences:

$$\frac{\Delta T_{i+1} - \Delta T_i}{\Delta t_i} = -\frac{\Delta T_i}{\tau} + \dot{q}(t_i)$$

The heating power $\dot{q}(t_i)$ is produced by discrete pulse packets with pulse energies $E_p(t_i)=E_{p,i}$.

Since the pulse duration is in each case very much shorter than the time constant $\tau$, a change in temperature can take place in each case owing to a quantity of heat $q(t_i)$, without producing appreciable discretization errors in the result. In this case, $q(t_i)$ is generally nonlinearly dependent on the pulse energy propagated by the optical component 1 and is described hereinafter using the notation $q(E_{p,i})$. The quantity of heat supplied can be approximated e.g. by a polynomial of arbitrary order n in $E_{p,i}$:

$$q(E_{p,i}) = \sum_{u=0}^{n} a_u (E_{p,i})^u$$

In this case, the index p distinguishes whether the input (in) or the output pulse energy (out) is involved, which is crucially responsible for the heating process. For example, an optically nonlinear crystal for frequency conversion in the optical component 1 typically brings about different degrees of absorption for input and output wavelengths of the light. In the example chosen, p=in is intended to indicate a primary dependence on the input pulses. The output pulse energy E out is calculated here by way of $h(\Delta T)$.

The effective temperature difference $\Delta T_i$ is included in the calculation at all times almost in real time. In the cold state, the initial value is $\Delta T_0=0$. Every requested (i-th) pulse with pulse energy $E_{p,i}$ makes an additive input $q(E_{p,i})$ to $\Delta T$ and the cooling process takes place in the dead times during which no pulses propagate through the optical component 1. A sequential specification in order to calculate $\Delta T_i$ following the i-th pulse is given for example as follows:

a) cooling during dead time $\Delta t_i$ in m steps where k=1 . . . m and $$\Delta t_i = \sum_{k=1}^{m} \Delta t_{i,k}:$$

$$\hat{\Delta T}_{i,0} = \Delta T_{i-1}$$

$$\hat{\Delta T}_{i,k} = \hat{\Delta T}_{i,k-1} - \frac{\hat{\Delta T}_{i,k-1}}{\tau} \Delta t_{i,k}$$

b) choose $E_{in,i}$ by means of 6 so that $E_{out,i}$ corresponds to the requested output pulse energy $E_{out,i}|_{target}$. In this example therefore:

$$E_{in,i} = \hat{h}^{-1}\left(\frac{E_{out,i}|_{target}}{1 + \hat{\Delta T}_{i,m}}\right)$$

c) change in the temperature: $\Delta T_i = \hat{\Delta T}_{i,m} + q(E_{in,i})$

The iterative procedure in subpoint a) is necessary if e.g. long temporal spacings between pulses arise and the condition $\Delta t_i \ll \tau$ is no longer met, which would lead to severe errors in the calculation of $\hat{\Delta T}_i$. A maximum discretization step $\Delta t_{d,max}=\alpha\cdot\tau$ is necessary so that $\Delta t_{i,k} \leq \Delta t_{d,max}$ holds true in all m steps. In this case, $\alpha \ll 1$ ought to be chosen, e.g. $\alpha=0.01$ or even less. The number of steps m is selected individually for every i-th pulse spacing according to these criteria. The corrections calculated in b) are implemented by the control unit 7 by way of control of the power setting device 6 for each pulse.

Such laser control could be implemented on a microcontroller or FPGA, for example.

In the case of multifactorial contributions to the thermal modification of the output pulse parameters, p effective temperatures $\Delta T_l$ can be included in the calculation, which yield a total correction $\Delta T_{total}$:

$$\Delta T_{total} = \sum_{l}^{p} \Delta T_l$$

with the respective p discretized differential equations which have to be solved for every i-th laser pulse, and with in each case an associated heating term $\dot{q}_l$ and time constant $$\tau_l: \frac{\Delta T_{l,i+1} - \Delta T_{l,i}}{\Delta t_i} = -\frac{\Delta T_{l,i}}{\tau_l} + \dot{q}_{l,i}$$

The calculation of the individual $\Delta T_{l,i}$ can be effected in each case according to the above scheme a)-c). Different contributions can be caused for example by varying absorption at different wavelengths during the frequency conversion or by heating of different mechanical components.

For the solution of $\Delta T_i$, it is necessary, apart from the initial value $\Delta T(t_{i=0})$, to determine the mapping $q(E_{in})$ and the time constant $\tau$. The differential equation for $\Delta T(t)$ has a simple solution in the case of a constant heating term $\dot{q}(t) = f_{rep} \cdot q(E_{in,j}) = $ const where $f_{rep} = $ const and initial value $\Delta T(t=0)=0$:

$$\Delta T(t)|_{q=q(E_{in,j})} = f_{rep} \cdot q(E_{in,j}) \cdot \tau \cdot \left(1 - e^{-\frac{t}{\tau}}\right)$$

Consequently, the time constant $\tau$ and $q(E_{in})$ can be determined by adapting the calibration function $$g_{cal}(t, E_{in,j}) = -b(E_{in,j}) \cdot e^{-\frac{t}{\tau}} + c \text{ where } b(E_{in,j}) = \tau \cdot f_{rep} \cdot q(E_{in,j})$$

to the measurement of the settling behavior of the output pulse energy $E_{out}$. This is possible since both the initial temperature $\Delta T_0$ and the pulse energies $E_{in}/E_{out}$, which are constant during the measurement, are known. During the measurement of the settling behavior, a laser system is operated from the cold state with a constant input pulse energy $E_{in}$ and constant pulse repetition frequency $f_{rep}=1/\Delta t_i=$const and the output pulse energy or power is recorded at sufficiently short time intervals $\Delta t_{mess} \ll \tau$ and stored.

The measurement of the settling behavior of the output pulse energy is repeated for at least n different settling curves in conjunction with n different, fixed heating powers or pulse energies $E_{in,j}$ where j=1, 2, . . . , n, such that at least n measurement series exist for unambiguously determining the heating contribution $$q(E_{in,j}) = \sum_{u=0}^{n} a_u (E_{in,j})^u$$

and the coefficients $a_u$ thereof.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating output laser pulses from input laser pulses having previously known pulse energies and pulse spacings, the method comprising:
   causing the input laser pulses to temporally successively pass through an optical component with temperature-dependent power efficiency, the optical component being heated by the passing of the input laser pulses, and the input laser pulses emerging from the optical component as output laser pulses for setting a respective pulse power component of the output laser pulses,
   calculating a current temperature or a current temperature difference of the optical component, or a temperature-dependent current parameter, based on all preceding input laser pulses or output laser pulses that have contributed to the heating of the optical component, and
   setting a power of a current input laser pulse based on the calculated current temperature, or the calculated current temperature difference, or the calculated current parameter, so that an associated output laser pulse has a pulse energy that deviates from a predefined pulse energy by less than 5%.

2. The method as claimed in claim 1, wherein the input laser pulses are amplified or frequency-converted by the optical component.

3. The method as claimed in claim 1, wherein the power of the current input laser pulse is set before passing through the optical component by trimming a pulse shape of the current input laser pulse.

4. The method as claimed in claim 1, wherein as soon as the current input laser pulse is generated, the power of the input laser pulse is correspondingly set based on the calculated current temperature, or the calculated current temperature difference, or the calculated current parameter.

5. The method as claimed in claim 1, further comprising amplifying the input laser pulses upstream of the optical component.

6. The method as claimed in claim 5, wherein at least one input laser pulse is amplified as a sacrificial laser pulse and is coupled out of a path of amplified input laser pulses upstream of the optical component.

7. The method as claimed in claim 1, wherein a plurality of adjacent input laser pulses pass through the optical component as a laser burst and emerge from the optical component as an output laser burst.

8. The method as claimed in claim 1, wherein the input laser pulses are provided at times such that the output laser pulses arrive at an output at individually requested times.

9. The method as claimed in claim 1, wherein individual laser pulses are selected from a pulse sequence of laser pulses having the known pulse energies and are provided as the input laser pulses.

10. The method as claimed in claim 1, wherein laser pulses are generated with the known pulse energies and pulse spacings as the input laser pulses.

11. A laser system for generating output laser pulses from input laser pulses, the laser system comprising:
   a pulse source for providing the input laser pulses having previously known pulse energies and pulse times,
   an optical component with temperature-dependent power efficiency, wherein the input laser pulses pass through the optical component, the optical component is heated by the passing of the input laser pulses, and the input laser pulses emerge from the optical component as output laser pulses,
   a power setting device for setting a respective pulse power of each of the input laser pulses, and
   a control unit programmed to calculate a current temperature or a current temperature difference of the optical component, or a temperature-dependent parameter based on all preceding input laser pulses or output laser pulses that have contributed to the heating of the optical component, and to control the power setting device to set the respective pulse power of a current input laser pulse based on the calculated current temperature, or the calculated current temperature difference, or the calculated current parameter so that an associated output laser pulse has a pulse energy that deviates from a predefined pulse energy by less than 5%.

12. The laser system as claimed in claim 11, wherein the optical component is an optical amplifier for amplifying the input laser pulses, or a conversion crystal for converting a frequency of the input laser pulses.

13. The laser system as claimed in claim 11, wherein the power setting device is configured as an acousto-optic or electro-optic modulator for trimming a pulse shape of the current input laser pulse, or is formed by a power closed-loop control facility for the input laser pulses generated by the pulse source.

14. The laser system as claimed in claim 11, further comprising an optical amplifier for amplifying the input laser pulses, the optical amplifier being arranged upstream of the optical component.

15. The laser system as claimed in claim 14, further comprising a coupling-out unit controlled by the control unit, wherein the coupling-out unit comprises an acousto-optic or electro-optic modulator for coupling amplified input laser pulses as sacrificial laser pulses out of a path of the input laser pulses, and the coupling-out unit is disposed downstream of the amplifier and upstream of the optical component.

16. The laser system as claimed in claim 11, wherein the pulse source comprises a laser pulse generator for generating laser pulses having the known pulse energies, and a selection unit for selecting some of the laser pulses as input laser pulses at the previously known pulse times, the selection unit being controlled by the control unit.

17. The laser system as claimed in claim 11, wherein the pulse source comprises a laser pulse generator controlled by the control unit in order to generate the input laser pulses having the known pulse energies and pulse times.

18. A non-transitory computer-readable medium having program code stored thereon, the program code, when executed by a computer processor, causing performance of the method as claimed in claim 1.

\* \* \* \* \*